United States Patent
Nolle et al.

(10) Patent No.: US 7,480,237 B2
(45) Date of Patent: Jan. 20, 2009

(54) PREDICTIVE UPSTREAM LOAD BALANCING

(75) Inventors: Steven P. Nolle, Naperville, IL (US);
Brian J. Barker, Naperville, IL (US);
Alan Doucette, Naperville, IL (US)

(73) Assignee: Arris International, Inc., Suwanee, GA (US)

(*) Notice: Subject to any disclaimer, the term of this patent is extended or adjusted under 35 U.S.C. 154(b) by 721 days.

(21) Appl. No.: 10/827,090

(22) Filed: Apr. 19, 2004

(65) Prior Publication Data

US 2005/0002331 A1    Jan. 6, 2005

Related U.S. Application Data

(60) Provisional application No. 60/463,565, filed on Apr. 17, 2003.

(51) Int. Cl.
*G01R 31/08* (2006.01)
*G06F 11/00* (2006.01)
*H04L 12/28* (2006.01)

(52) U.S. Cl. ............... 370/229; 370/230; 370/431; 370/468

(58) Field of Classification Search ............. 370/229, 370/230, 237, 230.1, 321, 235, 465, 468; 725/93, 95, 111, 116
See application file for complete search history.

(56) References Cited

U.S. PATENT DOCUMENTS

| 7,085,287 B1 * | 8/2006 | Chapman .................. 370/468 |
| 2006/0120282 A1 * | 6/2006 | Carlson et al. ............. 370/229 |

* cited by examiner

*Primary Examiner*—Chirag G Shah
*Assistant Examiner*—Srinivasa R Reddivalam
(74) *Attorney, Agent, or Firm*—John Doughty (57) ABSTRACT

Static balancing of cable modems across upstream channels is made based on the channel's current bandwidth demand compared to a first and/or second CAC threshold level. If both threshold levels are exceeded, the modem is assigned to the channel having the lowest bandwidth demand. After registration, predictive balancing modems according to whether an MTA is part of a given modem avoids concentration of modems having MTAs on certain channels while other channels serve only modems without MTAs. Modems are also predictively balanced according to whether they have associated a DSA_use_history profile. Modems associated with certain subscribers may be balanced according to the time of day balancing is occurring based on the profile. Thus, light users during working hours may be balanced as heavy users at night if they typically download video content or use VoIP features during the evening.

4 Claims, 4 Drawing Sheets

PREDICTIVE UPSTREAM LOAD BALANCING

CROSS REFERENCE TO RELATED APPLICATION

This application claims the benefit of priority under 35 U.S.C. 119(e) to the filing date of Nolle, et. al., U.S. provisional patent application No. 60/463,565 entitled "Predictive Upstream Load Balancing", which was filed Apr. 17, 2003, and is incorporated herein by reference in its entirety.

FIELD OF THE INVENTION

The present invention relates generally to transmission of information in a broadband communication network, and more specifically to assigning user equipment to upstream channels such that upstream traffic is distributed as evenly as possible among a plurality of available upstream channels.

BACKGROUND

In a communication network, such as, for example, a network where a cable modem termination system ("CMTS") communicates with a plurality of subscriber premise equipment devices, such as cable modems, at individual subscriber's locations, it is desirable to balance the number of subscribers using a given upstream communication channel to avoid a scenario where multiple heavy users are assigned to one channel while several other light users are assigned to another. When too many users are each using a large amount of bandwidth relative to the capacity of a given communication channel, all of the users of the given channel suffer reduced transmission rates.

The Data Over Cable Service Interface Specification ("DOCSIS"), which is known in the art, implements certain features, such as dynamic channel change ("DCC") and upstream channel change ("UCC") to facilitate changing channels for a given user, even during a given session. However, determining when to change a channel is not part of the DOCSIS specification, and service providers may want to set different criteria for when a user/subscriber device is to change from one channel to another. A desired distribution of subscribers to available channels may be based on a variety of factors, such as ability to provide an agreed upon level of service that users pay varying amounts for based on the level of service desired, and network infrastructure matters, such as whether a particular branch of an HFC cable plant is out of service, as well as other factors.

Although it may be desirable to change the channel a particular user is assigned to after a given cable modem has complete its ranging and registering process, ranging and registering being known in the art, it is also desirable to assign channels during the initialization process. A measurable amount of time is used when a channel is changed during a session, thereby resulting in a potential for signal and message distortion, such as, for example, jitter and/or latency, which are known in the art. This can be irritating when a channel is changed during a telephone call where Voice over IP is used in providing telephone service, as sometimes a two or three second delay can interrupt a conversation while the channels are changed.

Thus, there is a need in the art for a method and system for facilitating intelligent assignment of channel resources such that channel changes during a session are rare. Furthermore, there is a need for a method and system for changing channels such that efficient use of the communication network is dynamically maximized when needed, while still minimizing the number of changes made during a session.

SUMMARY

At least three phases of load balancing are implemented to facilitate efficient resource allocation that provides high quality service to subscribers. First, a static load balancing process is implemented when the CMTS detects a cable modem via a range request. The CMTS checks to see if there is another upstream channel that is less heavily loaded with respect to bandwidth capacity. By providing provisionable channel access control ("CAC") levels, service providers can actively provide load balancing that maximizes the balance between quick, low-overhead, load-balancing or a more active and accurate load balancing, but with more overhead and processing time demands. Performing static load balancing in this manner is efficient since performing an upstream channel override command to change a cable modem to a new channel prior to registration is a small amount of overhead for both the modem and the CMTS. As a CM completes registration, a variable value Tmin is transmitted to the CMTS. Tmin is based on the primary service flow value assigned to the cable modem and is determined based on subscription-service-level information sent from the CMTS to the modem at boot-up. The primary service flow is determined based on the type of service the cable modem is provisioned for, and the actual service being facilitated. For example, if the primary service flow is for transmitting and receiving data, the Tmin value would be less than for a modem that includes a multimedia terminal adaptor ("MTA"), MTAs being typically used for providing voice over IP, and other multimedia services. Accordingly, the Tmin values for cable modems that are registered are used to increment the CAC values for a given upstream channel so that the CAC values provide accurate information for load balancing when additional modems are ranging. Thus, modems are efficiently assigned to upstream channels based on their expected service flow levels so that a cable group includes some modems that have high Tmin values and others that have low Tmin values. Thus, a scenario is avoided where a particular network cable group includes only modems having high Tmin values while another cable group includes only modems provisioned for data service.

This scenario can be analogized to a scenario involving shuffling a deck of cards, where in one hand are all face cards and in the other are all number cards. It is desired that the entire face cards and number cards are distributed in a balanced manner through out the deck. So, the cards in the left hand are shuffled with the cards in the right hand so that when the cards a dealt from the top of the deck to a number of players, each player has a likelihood of getting some face cards and some number cards. If the deck was not shuffled, some players might get all face cards and some might get all number cards. This would obviously not be fair, and some players would not play if cards within the deck were so unfairly distributed (unbalanced).

Similarly, if the bandwidth usage of a plurality of cable modems is not balanced, the cable modems that have high bandwidth demands may be included in one cable group and the same number of modems having low bandwidth needs may be included in another. This could result in the service being provided to the subscriber's modems with high bandwidth needs becoming congested while the service provided to the subscribers demanding less bandwidth would receive relatively delay-free service. This obviously would not be fair, especially since subscribers of services requiring larger amounts of bandwidth than others would be paying their service provider higher fees in exchange for the better service. Therefore, when the ranging request is received at boot up, the cable modems are initially assigned to channels so that they are balanced based on the currently existing service flows and the reserved bandwidth provisioned for each modem.

The CAC levels are used as threshold reference points determine when to implement static load balancing a modem or modems are booting up and being detected by the CMTS. The CAC threshold value for a given channel is provisioned and usage is based on the cumulative Tmin values for devices already assigned to a given channel.

A service provider that may want less active load balancing—for example with many thousands of Cable Modems provisioned to use a single cable group and/or use patterns that cause a large number of CMs to initialize at the same time. For those situations, a service provider can provision a channel's or channels' CAC threshold values higher to reduce the amount of load balancing activity that occurs as modems come onto the network.

In addition to comparing cumulative Tmin values to CAC channel values, the type of cable modem can be taken into account. For example, modems can be categorized into those not having an MTA and those that do, or, those that do not have an MTA but have a high Tmin based on the service level being paid for. Modems having MTAs, or high Tmin values, can be intermingled with those that do not so that a node serves some modems having an MTA, or high Tmin, and some that do not, as in the card shuffling scenario described above. This is desirable because a modem having an MTA may have a small Tmin value for data communication, but when an attached telephone is placed off hook to make a telephone call, a large amount of bandwidth is suddenly used for the voice call, as high bandwidth is used for voice calls, and transmission of other multimedia content, to avoid latency delays that can frustrate a real-time telephone conversation, for example. Thus, spreading high bandwidth users over multiple nodes, rather than one particular node, avoids one node becoming overloaded, which degrades the performance of information transfer for all subscribers connected to the channel. The changing of channels from a requested channel to a channel that will result in a more balanced distribution is typically carried out using Dynamic Channel Change and/or Upstream channel change.

In another aspect, a historical usage profile of a particular cable modem—which typically corresponds to a particular user, especially in a residential setting, but even in a business setting—is used to predictively assign a cable modem attempting to range and register. For example, if a particular user typically uses a broadband connection for downloading media content during the evening, media content such as video typically requiring large amounts of bandwidth, the profile for that user would typically indicate light usage during the daytime and middle of the night, but would indicate relatively heavy usage during the hours of between 9:00 and 11:00 P.M. Thus, if the user decided to log onto the communication network during the middle of a work day, the profile would indicate light usage and would be treated as such by the CMTS as far as assigning an upstream channel. However, if the user logged on, causing the modem to range and register, during the evening at 9:00 P.M., then the CMTS would assume, based on the profile, that the user would be requiring a large amount of bandwidth relative to the amount used during the day time. Accordingly, the upstream channel would be assigned accordingly.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. This disclosure is not intended nor is to be construed to limit the present invention or otherwise to exclude other embodiments, adaptations, variations, modifications and equivalent arrangements, the present invention being limited only by the claims appended hereto and the equivalents thereof.

Figure 1:
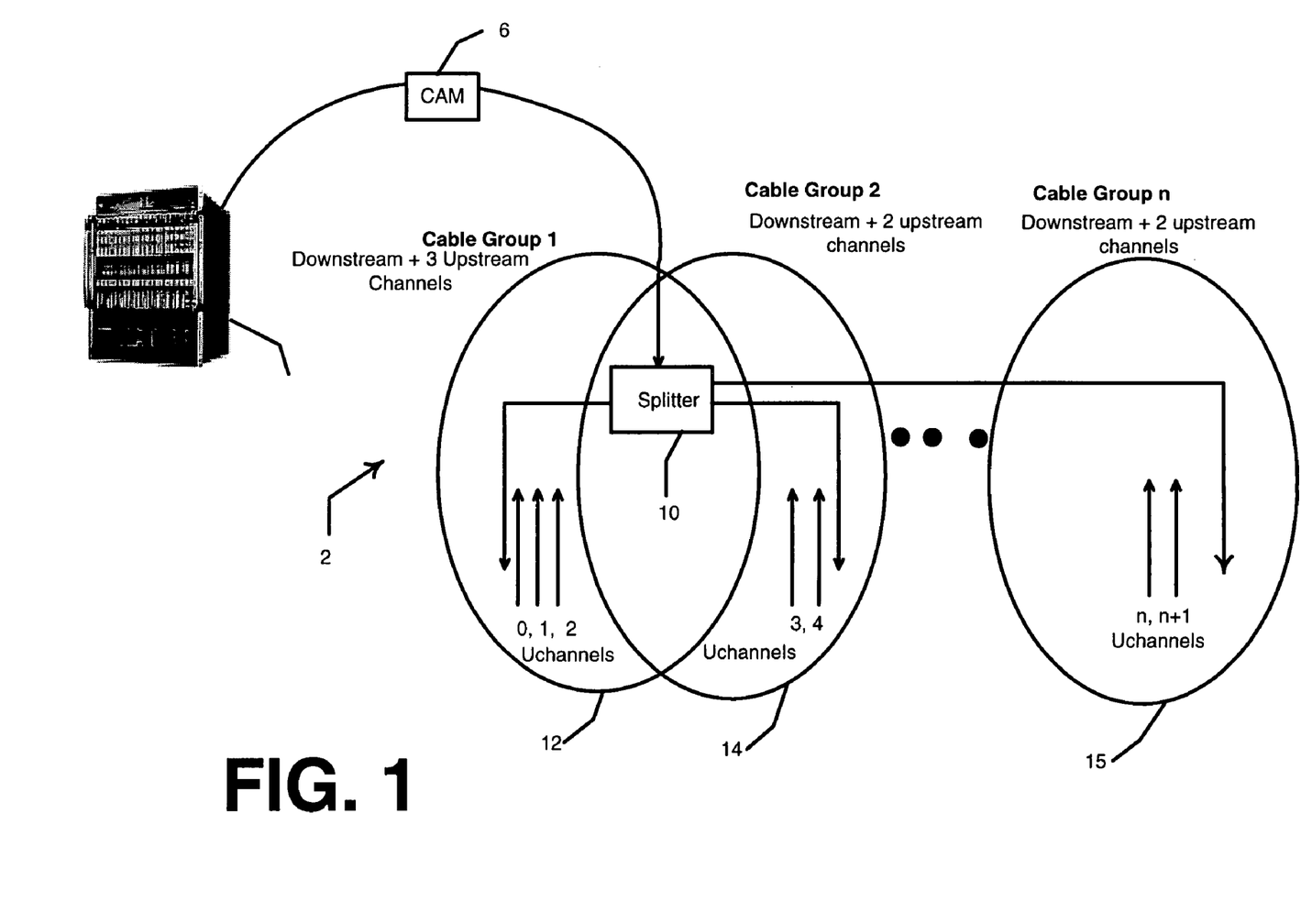
FIG. 1 illustrates a broadband network having two cable groups.

Turning now to the figures, FIG. 1 illustrates broadband network system 2 where CMTS 4 interfaces through cable access module ("CAM") 6 with broadband network 8, such as a hybrid fiber coax network ("HFC") known in the art. Splitter 10 is connected to CAM 6 and splits cable modems connected thereto into groups, referred to as cable groups. A cable group is a set of upstream channels that are physically reachable by a set of cable modems. Furthermore, a cable group may also span across multiple media access control layer domains ("MAC"), although typically a cable group corresponds to a MAC domain, as known in the art, and modems of a cable group usually are served by the same node.

In the figure, cable groups one, two and n are represented by the ovals 12, 14 and 15 respectively. Group one is currently provisioned with one downstream and three upstream channels. Group two 14 and n are provisioned with one downstream and two upstream channels. Channel changes can be made to better balance the traffic loading of the modems within group one or within group 2, or across groups as discussed above. For example, if swapping channels would result in a better balance, channels could be changed so that a modem of group one 12, assigned to upstream channel 0, could be assigned to upstream channel 2. It will be appreciated that CMTS 4, CAM 6 and splitter 10 are typically located at the service provider's central location or head end location.

Figure 2:
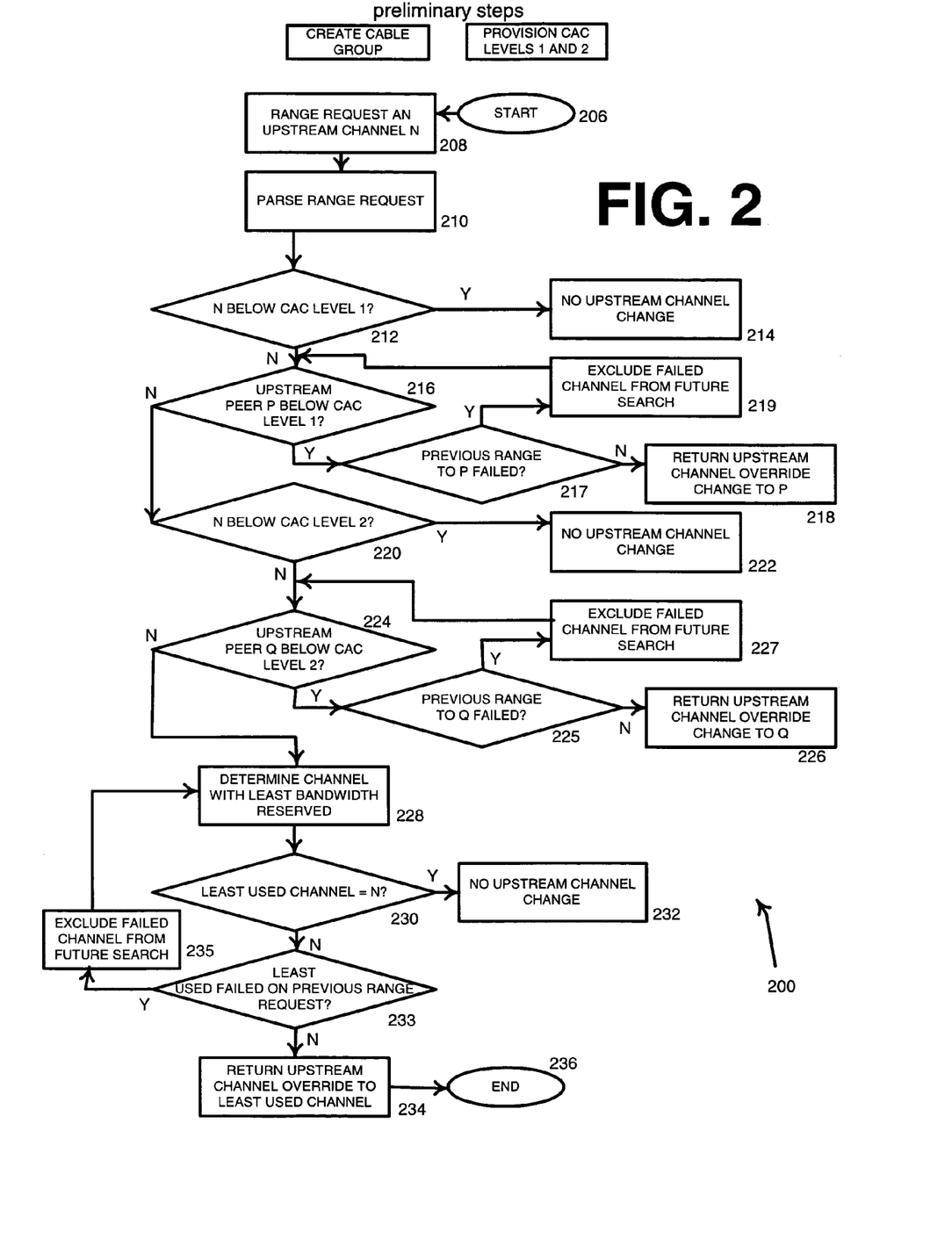
FIG. 2 illustrates a flow chart of a method for static load balancing.

Turning now to FIG. 2, a flow chart representing an algorithm 200 for statically balancing the usage load of modems in a cable group is shown. After a cable group has been established at step 202, the available channels for a given group are provisioned, including provisioning of CAC threshold levels. The CAC threshold levels are set at step 204 so that during ranging of a plurality of modems, an initial maximum number of modems will be provisioned for a given channel, based on the total reserved bandwidth of all the active service flows of the modems that a given node serves. This results in an even distributing of reserved bandwidth for modems as the plurality of modems come on line following boot up. This also results in a single modem that is booting up being assigned to a channel so that bandwidth utilization is evenly spread as well as possible.

Two CAC levels are set in the preferred embodiment. Providers that require very active load balancing so that the reserved bandwidth of the upstream channels are always very nearly equal will want to set the CAC levels to very low levels. For example, a first level could be set so that not more than a 1% imbalance will exist before channel changes are requested by algorithm 200 when a modem attempts to range. A second CAC threshold level could be set so that a 5% bandwidth usage imbalance is permitted when there are no channel usage levels below the first CAC threshold level for available channels, based on the sum of the reserved bandwidth for modems that are already registered, before further channel changes are implemented.

It is possible that modems are provisioned in such a way that the Tmin value for its service flows are equal to zero. Therefore provisions are made for the CMTS to assign a provisionable "nominal Tmin" for the purposes of incrementing CAC values and triggering load balancing. Since in the current example, the maximum imbalance is set to 1% of bandwidth for a given channel, Tmin is initialized to at least a nominal value of 1000 bps, thus allowing 32 cable modems at most to be initially provisioned to a given upstream channel where the CAC level 1 bandwidth of a given channel is set to 32 Kbps.

When a modem attempts to register at step 206, a range request is sent to the CMTS at the head end requesting to be assigned to a given channel N at step 208. The CMTS parses the range request at step 210 and executes the check in step 212 to determine whether the sum of Tmin values for modems already assigned to channel N is below CAC level 1. If there are fewer than 32 modems assigned to the requested channel N (with Tmin values of zero), it will be determined at step 212 that the CAC threshold-one value has not been exceeded, and the CMTS will return the range response that no channel change is required at step 214.

If, however, it is determined at step 212 that CAC level 1 has been exceeded, based on the Tmin values of the modems already assigned to channel N, then algorithm 200 will proceed to step 216. At step 216, algorithm 200 determines whether there are any upstream channels P associated with the cable group comprising the requesting cable modem for which the CAC level one has not been exceeded. If there are, then the process advances to step 217, where a determination is made whether an attempt to assign the modem to channel P been attempted, and that attempt failed. If not, the method proceeds to step 218, where a range response is sent to the modem to tune to channel P, a channel for which the CAC level one value has not been exceeded. If as attempt to assign to channel P has been attempted before and failed, then current channel P is excluded from channels to be scanned, and control returns to step 216 to determine whether there is another channel for which CAC level one has not been exceeded. Thus, if there is a physical reason, for example, why a given channel has not been assigned, even though its CAC level one has not been exceeded, such as for example, a backhoe severed a line that carries the channel, then resources will not be wasted polling the faulty channel, and an endless loop scenario is avoided. If there are not any available channels that are below CAC level one, the algorithm advances to step 220.

At step 220, a determination is made whether channel N is below CAC level two. If so, the CMTS returns a range response at step 222 that no channel change is required, and permission is granted to the modem to register on channel N. If the combined Tmin values for channels assigned to channel N exceeds CAC level 2, then the method proceeds to step 224.

If it is determined at step 224 that at least one channel Q is available which is at or below CAC level two, then the process advances to step 225, where a determination is made whether an attempt to assign the modem to channel Q been attempted, and that attempt failed. If not, the method proceeds to step 226, where a range response is sent to the modem to tune to channel Q. If an attempt to assign to channel Q has been attempted before, then channel Q is excluded from channels to be scanned at step 227, and control returns to step 224 to determine whether there is another channel for which CAC level two has not been exceeded. If at step 224 it is determined that there are not any channels that are below CAC level two, algorithm 200 advances to step 228.

At step 228, all upstream channels available for a give cable group are scanned to determine which one has the least percentage of bandwidth assigned to other cable modems. If the least used channel L (channel having the greatest percentage of unallocated bandwidth) is channel N, as determined at step 230, then algorithm proceeds to step 232, where a range response is sent that no upstream channel change is required. If L is not equal to N, then the process advances to step 233, where a determination is made whether an attempt to assign the modem to channel L has been attempted, and that attempt failed. If not, the method proceeds to step 234, where a range response is sent to the modem to tune to channel L. If as attempt to assign to channel L has been attempted before, then this channel is excluded from channels to be scanned at step 235, and control returns to step 228 to determine the least used channel from the remaining channels in this cable group. Using the CAC threshold levels provides the advantage that a relatively quick balancing of ranging modems can be performed, as the CMTS can make a very quick check on the capacity available for a given channel. Even if the first threshold cannot be satisfied, the same process is used to determine whether assigning a modem to a particular channel will exceed the second threshold. These determinations consume a relatively small amount of computing resources. Also, the advantage is provided that balance can be achieved where some upstream channels have different assigned maximum bandwidths, since the percentage usage of available bandwidth is used, rather than the absolute amount of available bandwidth, because modems would tend to be directed to tune to channels having the largest amount of available bandwidth. Such an imbalance, where a channel provisioned to carry a larger amount of traffic than another could be a problem if the reason it is provisioned to carry different types of traffic than another, for example video (high bandwidth requirement) as opposed to internet traffic (low bandwidth requirement). If too many modems are assigned to a high bandwidth channel when high bandwidth is not required, then channels changes would have to be implemented to accommodate increased bandwidth demands when users that are assigned to the high bandwidth channels actually place high bandwidth demands. The provisioning of such high bandwidth may be accomplished as described in reference to FIG. 2.

Figure 3:
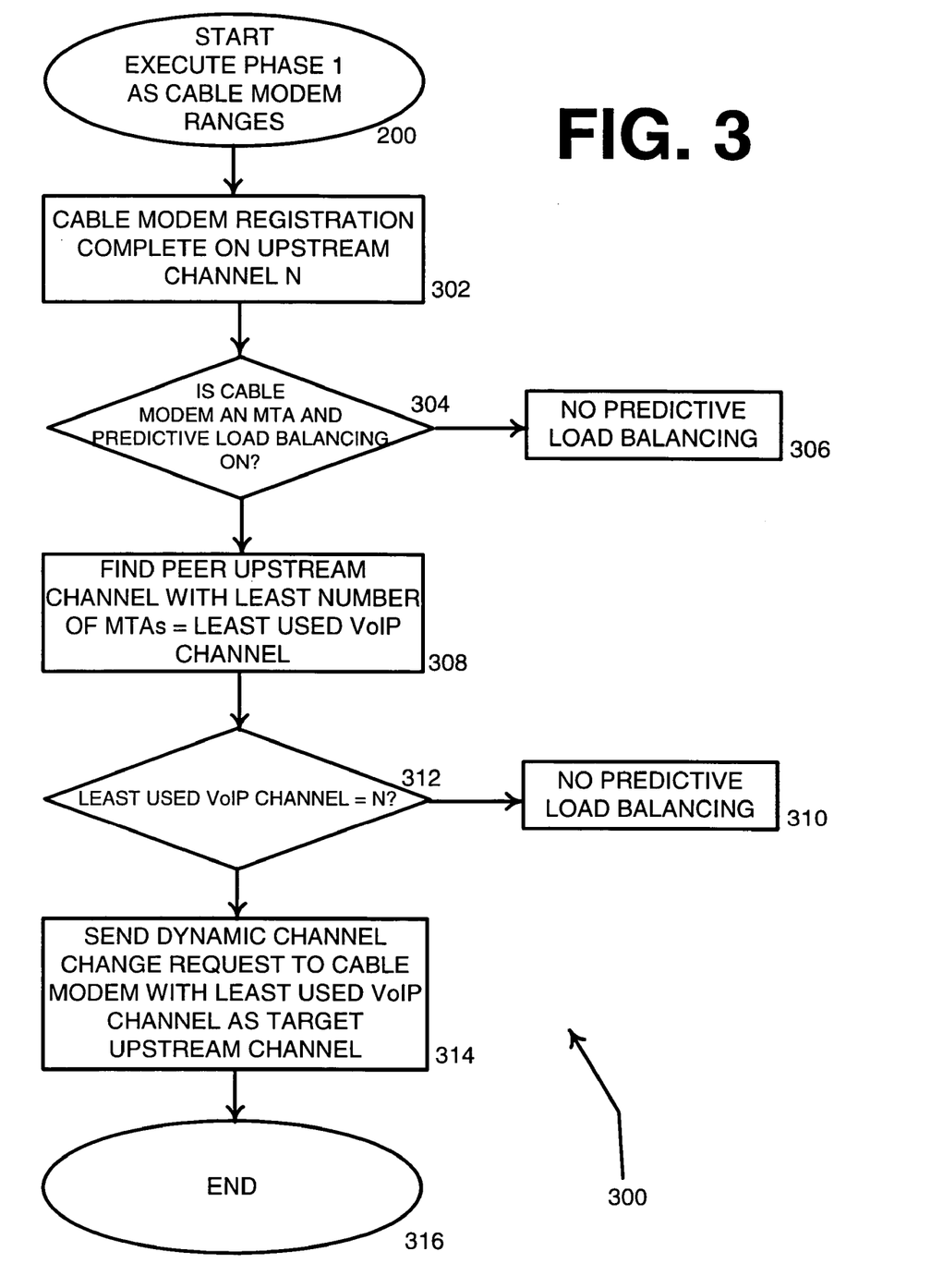
FIG. 3 illustrates a flow chart of a method for predictive load balancing based on modem type.

Turning now to FIG. 3, a flow chart representing a method 300 for performing an aspect of predictive load balancing is shown. After static load balancing, as represented by method 200 described in reference to FIG. 2 has ended, a cable modem completes it registration process at step 304. Registration is known in the art, and need not be discussed further except to state that when the modem has registered, it has been assigned to a particular channel, channel N as shown in the figure. After registration is complete, a determination is made immediately at step 304 whether the modem that has just registered comprises an MTA—used for interfacing with the communication network to facilitate providing access to multimedia content, such as audio, video, and voice over IP.

If the modem does not comprise an MTA, no further load balancing during method 300 is performed and the method ends at step 306. If the modem does include an MTA, then the method progresses to step 308. At step 308, all of the channels associated with a particular cable group are scanned to determine which upstream channel has the least number of modems having an MTA assigned thereto. The channel having the least number of MTA-modems associated with it would typically be a channel having the least amount of voice over IP traffic, since subscribers who subscribe to voice over IP services would typically have modems with MTAs.

After algorithm 300 determines which upstream channel has the least number of MTA-modems assigned to it, a determination is made at step 312 whether the channel N than the given modem has been assigned to is the one having the least number of MTAs. If so, no further load balancing is performed by method 300, and the algorithm ends at step 310. If it is determined at step 312 that channel N is not the upstream channel having the fewest MTA-cable-modems assigned to it, then a channel change request, preferably a dynamic channel change request, is sent to the modem instructing it to tune to the channel having the fewest MTA-modems attached, as determined at step 308. After the channel change request has been sent, the algorithm ends at step 316.

Thus, algorithm 300 provides the advantage that after the modems served by a particular node are statically balanced within the threshold limits as described in reference to FIG. 2, the modems can be further balanced by predicting the probable traffic demands of each of the plurality of modems based on whether a given modem uses an MTA or not. As discussed above, an MTA typically corresponds to a subscriber that has subscribed to voice over IP services, or some other service that requires multimedia support, multi media and VoIP being services that require a large amount of bandwidth relative to data-only traffic. Accordingly, algorithm 300 predicts the bandwidth usage requirements of the modems connected to a given node based on the assumption that a modem with an MTA will require larger average amounts of bandwidth than those that do not. Assignments are made such that MTA-modems are distributed as evenly as possible over one or more cable groups served by the node. Like the card shuffling scenario discussed above that facilitates distributing face cards throughout the deck so that cards are fairly dealt to players, MTA-modems are distributed across multiple cable groups so that any one upstream channel will not be burdened with carrying mostly MTA-modems, and thus the associated heavy traffic, while other upstream channels are only required to carry light traffic loads.

This has the advantage that the load balancing does not wait until phone calls are being made to start load balancing the MTAs, which could cause possible service-affecting disturbances as well as requiring more MTA and CMTS processing power and time.

Figure 4:
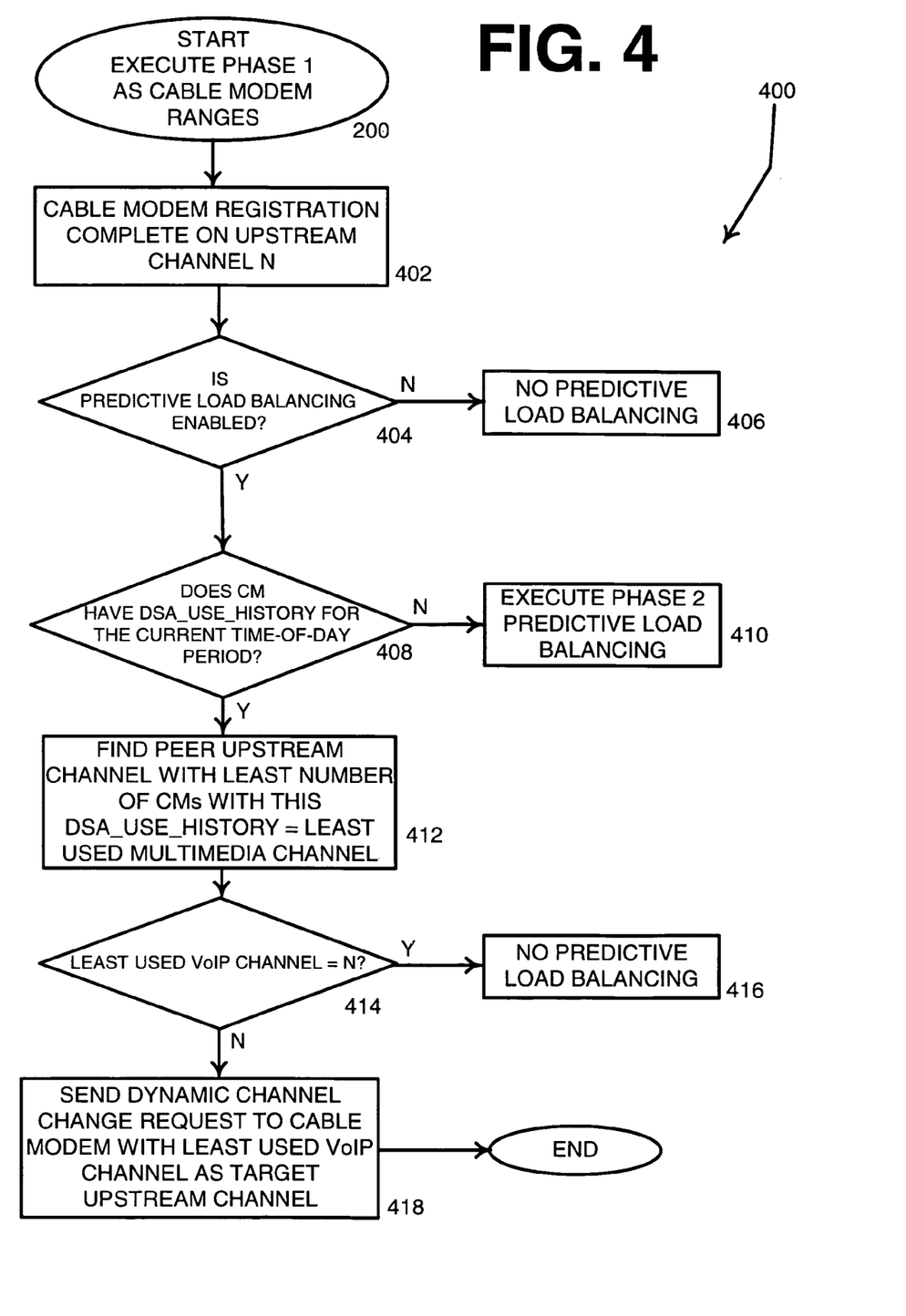
FIG. 4 illustrates a flow chart of a method for predictive load balancing based on a modem's historical usage profile.

Turning now to FIG. 4, another algorithm 400 that implements a predictive load balancing aspect is shown. After static load balancing of phase 1 shown in FIG. 2 is compete for a given modem, and registration is complete at step 402 for a given modem on channel N, algorithm checks to determine if predictive load balancing is enabled at the CMTS for the node that serves the modem at step 404. If predictive load balancing is not enabled, then the algorithm ends at step 406. If predictive load balancing is determined to be enabled at step 404, then algorithm 400 determines at step 408 whether a DSA_use_history profile, also referred to above as the historical use profile, exists for the cable modem. If a historical use profile does not exist, then algorithm 400 proceeds to step 410, and the predictive load balancing algorithm 300 described above in reference to FIG. 3, is performed.

If a historical use profile is determined to exist at step 408, then algorithm 400 proceeds to step 412. At step 412, algorithm 400 initiates a search of the upstream channels to determine which one has the least number of cable modems having a use profile associated with it. Like step 308 of algorithm 300 shown in FIG. 3, where a modem that includes an MTA typically correlates to a subscriber that subscribes to high bandwidth services, having a bandwidth usage profile also correlates to a user that may, from time to time, require a lot of bandwidth.

However, in addition to roughly determining that a user may require a relatively large amount of bandwidth compared to a user who does not have use an MTA modem, the historical profile allows a fine tuning of load balancing based on the time of day that a modem is registering.

For example, a user may work from home and typically only send and receive data during working hours while placing or receiving relatively few telephone calls during working hours. Thus, the user's actual bandwidth usage would be low during the day. However, after normal working hours, the user may typically place and/or receive many lengthy telephone calls using the VoIP capabilities of the user's MTA-cable modem. As known in the art, these after work hours calls would require much higher bandwidth than the data services used during the daytime.

Accordingly, if a historical profile analyzes and stores in a memory device, either at the modem, the CMTS, or other storage device accessible by the CMTS/cable modem communication network, the bandwidth usage of the user throughout a day, then the profile can be used to determine which upstream channel a modem should register to when ranging and registering. To facilitate this, the profile would typically sample the user's usage throughout the day and calculate and store an average usage for a given period. This period is preferably three hours, but could be longer or shorter depending on the service providers preference. Those skilled in the art will appreciate that shorter periods provide greater resolution and a more finely balanced distribution of modems/upstream channels at any given time. However, the greater resolution advantage could be negatively offset by greater data storage and computing resource usage requirements, which would slow down the registration process and increase costs.

In addition to the period resolution of the profile, the number of previous periods used in computing the period averages may also be selected by the service provider. For example, a provider may elect to save a different profile for every subscriber for every day of the week, since a user's traffic throughout a given day may be much different for a Sunday than for a Monday. Thus, if a modem is attempting to register on a Monday, algorithm 400 would use the Monday profile for the user attempting to register. Alternatively, provider may decide that using the previous days usage pattern may suffice, since a given subscriber/user may be on vacation on Sunday and Monday for example, and usage of a normal Monday profile would cause algorithm 400 to assign the user's modem to a low multimedia usage channel when the user is only logging on momentarily to retrieve e-mail messages while in a hotel room. Thus, the normally-heavy-traffic-usage-on-Monday user's modem would not be assigned to a light usage channel, thereby preventing another modem attempting to register later from having access to the light usage channel.

Regardless of the period resolution, when a cable modem attempts to register, the CMTS analyzes the particular modem's profile and predicts the likely bandwidth usage demands the modem's user will place on the channel. For the scenario given above where the user works from home, if the cable modem attempts to register while during the day, the CMTS will determine that the user will probably only be transmitting data, and the modem will treated as a low bandwidth user for purposes of load balancing. However, if the same user is attempting to log on during the evening, while the modem is ranging and registering, the CMTS will determine that the user will likely be requiring a large amount of bandwidth (to converse using voice over IP), and will treat the modem as if it will be soon sending and receiving heavy traffic.

If the channel N that the modem is attempting to tune to during registration is the least used multimedia channel, based on the profiles of other modems already registered to channel N, then no further load balancing is needed and the algorithm ends at step 416. If, however, there is a channel other than channel N that has a lower multimedia usage, based on the profiles of other modems registered thereon, then algorithm 400 advances to step 418, and a preferably DCC request is sent to the cable modem attempting to register that it should attempt to tune to the lower multimedia usage channel. This provides the advantage that historical usage of a particular user is used to refine the load balancing of a network as users individually log on to the network, or even when the CMTS is booting up and all modems actively connected to the network are attempting to range and register simultaneously. It will be appreciated that using the historical profile of a user to balance traffic loading immediately after the CM or MTA is registered will result in a system that is better balanced with as few as possible dynamic channel changes occurring while subscribers are actually using the services, thereby reducing CM, MTA and CMTS processing time and overhead for load balancing and improving the subscribers experience of use of broadband data and multimedia services.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

We claim:

1. A method for balancing upstream traffic of a subscriber device in a broadband communication network over a plurality of upstream channels, comprising:
    performing static load balancing when the subscriber device requests an upstream channel; and
    performing predictive load balancing between upstream channels based on the number of subscriber devices configured with a media terminal adaptor such that the upstream channel assignment of user devices having an MTA is spread across the upstream channels, wherein the step of static load balancing includes:
    assigning a requesting subscriber device to a requested channel if the cumulative upstream bandwidth demand of the subscriber devices currently assigned thereto is below a first predetermined CAC threshold level;
    assigning a requesting subscriber device to the requested channel if the cumulative upstream bandwidth demand of the subscriber devices currently assigned thereto is below a second predetermined CAC threshold level, and none of the upstream channels have a cumulative upstream bandwidth demand below the first predetermined threshold; and
    assigning the requesting subscriber device to the upstream channel having the lowest bandwidth demand if none of the plurality of upstream channels has a bandwidth demand below the first or second predetermined threshold levels.

2. A method for balancing upstream traffic of a subscriber device in a broadband communication network over a plurality of upstream channels, comprising:
    performing static load balancing when the subscriber device requests an upstream channel; and
    performing predictive load balancing between upstream channels based on the number of subscriber devices configured with a media terminal adaptor such that the upstream channel assignment of user devices having an MTA is spread across the upstream channels wherein the step of static load balancing includes:
    assigning a requesting subscriber device to a requested channel if the cumulative upstream bandwidth demand of the subscriber devices currently assigned thereto is below a first predetermined CAC threshold level;
    assigning a requesting subscriber device to the requested channel if the cumulative upstream bandwidth demand of the subscriber devices currently assigned thereto is below a second predetermined CAC threshold level, and none of the upstream channels have a cumulative upstream bandwidth demand below the first predetermined threshold; and
    assigning the requesting subscriber device to the upstream channel having the lowest bandwidth demand if none of the plurality of upstream channels has a bandwidth demand below the first or second predetermined threshold levels;
    wherein a subscriber device will not be assigned to a given channel if an attempt to communicate using said channel has failed.

3. A method for performing static load balancing of one of a plurality of subscriber devices in a broadband communication network over a plurality of upstream channels, comprising:
    assigning the one subscriber device to an upstream channel based on the number of subscriber devices assigned to communicate over each of the upstream channels wherein the cumulative bandwidth of the subscriber devices assigned to a channel is compared to a predetermined CAC threshold level for said channel;
    assigning a requesting subscriber device to a requested channel if the cumulative upstream bandwidth demand of the subscriber devices currently assigned thereto is below a first predetermined CAC threshold level;
    assigning a requesting subscriber device to the requested channel if the cumulative upstream bandwidth demand of the subscriber devices currently assigned thereto is below a second predetermined CAC threshold level, and none of the upstream channels have a cumulative upstream bandwidth demand below the first predetermined threshold; and
    assigning the requesting subscriber device to the upstream channel having the lowest bandwidth demand if none of the plurality of upstream channels has a bandwidth demand below the first or second predetermined threshold levels.

4. A method for performing static load balancing of one of a plurality of subscriber devices in a broadband communication network over a plurality of upstream channels, comprising:

assigning the one subscriber device to an upstream channel based on the number of subscriber devices assigned to communicate over each of the upstream channels wherein the cumulative bandwidth of the subscriber devices assigned to a channel is compared to a predetermined CAC threshold level for said channel;

assigning a requesting subscriber device to a requested channel if the cumulative upstream bandwidth demand of the subscriber devices currently assigned thereto is below a first predetermined CAC threshold level;

assigning a requesting subscriber device to the requested channel if the cumulative upstream bandwidth demand of the subscriber devices currently assigned thereto is below a second predetermined CAC threshold level, and none of the upstream channels have a cumulative upstream bandwidth demand below the first predetermined threshold; and assigning the requesting subscriber device to the upstream channel having the lowest bandwidth demand if none of the plurality of upstream channels has a bandwidth demand below the first or second predetermined threshold levels;

wherein a subscriber device will not be assigned to a given channel if an attempt to communicate using said channel has failed.

* * * * *